United States Patent
Feist et al.

(10) Patent No.: US 8,004,786 B2
(45) Date of Patent: Aug. 23, 2011

(54) TRANSDUCER-DATA STORAGE MEDIUM SPACING ADJUSTMENT

(75) Inventors: Jason M. Feist, Shakopee, MN (US);
Dallas S. Holm, Jr., Savage, MN (US);
Siew Kin Chow, Shakopee, MN (US);
Scott E. Ryun, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 785 days.

(21) Appl. No.: 11/357,821

(22) Filed: Feb. 17, 2006

(65) Prior Publication Data

US 2007/0195449 A1 Aug. 23, 2007

(51) Int. Cl.
*G11B 21/02* (2006.01)
(52) U.S. Cl. .................................................. 360/75
(58) Field of Classification Search .......... 360/75, 360/77.01, 77.04, 77.06, 71, 246.6, 246.2, 360/313, 234.7, 294.4
See application file for complete search history.

(56) References Cited

U.S. PATENT DOCUMENTS

| | | | | |
|---|---|---|---|---|
| 4,787,001 A * | 11/1988 | Okutsu | ...................... | 360/246.6 |
| 5,719,720 A * | 2/1998 | Lee | ................................ | 360/71 |
| 5,907,457 A * | 5/1999 | Kudo et al. | ................. | 360/246.2 |
| 6,587,314 B1 * | 7/2003 | Lille | ............................. | 360/313 |
| 6,611,399 B1 * | 8/2003 | Mei et al. | ................... | 360/234.7 |
| 6,700,727 B1 * | 3/2004 | Crane et al. | ..................... | 360/75 |
| 2004/0257707 A1 | 12/2004 | Thurn et al. | | |
| 2005/0047017 A1 | 3/2005 | Mei et al. | | |
| 2005/0047024 A1 * | 3/2005 | Yamazaki et al. | ........ | 360/294.4 |

* cited by examiner

*Primary Examiner* — Fred Tzeng
(74) *Attorney, Agent, or Firm* — Hollingsworth & Funk, LLC

(57) ABSTRACT

A data storage device, e.g., a disc drive, includes one or more heads including a transducer. Each head also includes a deformable material that allows the spacing adjustments between the transducer and a data storage medium, e.g., a data storage disc, according to each of a plurality of settings. The device calculates a response function of a spacing change to a setting change for each head by measuring a change in the pole tip-data storage medium spacing corresponding to at least two settings. The device also determines an optimal setting. The device may also repeat response function calculations and/or determination of optimal settings to ensure continued optimal performance of the device. In summary, the device sets an optimal setting for each head according to a calculated response function particular to each head.

20 Claims, 6 Drawing Sheets

TRANSDUCER-DATA STORAGE MEDIUM SPACING ADJUSTMENT

TECHNICAL FIELD

The invention relates to adjusting spacing between a transducer and a data storage medium in a data storage device, e.g., a disc drive.

BACKGROUND

Disc drives include one or more heads including read/write transducers. Each head is mounted in an air bearing slider. During operation, a disc rotates at a high speed, which generates an air current immediately adjacent to the surface of the disc. The air currents act upon a lower air bearing surface of the slider and generate a lift force to direct the slider away from the disc and against a load beam. This causes the slider to fly at an ultra-low height above the disc. For the disc drive to function properly, the slider must maintain the proper fly height and provide adequate contact stiffness to assure that the slider does not contact the disc during operation.

Decreasing fly height of the slider allows transducers in the head to achieve greater resolution between the individual data bit locations on a disc. It is desirable to have heads fly as close to a disc as possible. Furthermore, fly height precision is directly related to drive reliability in all disc drives, and, in general, greater fly height precision is required as data storage density of a disc medium increases.

In a conventional air bearing slider, the slider body is formed from a substrate wafer of conductive ceramic material. On this substrate, a thin film of insulating material is deposited, and a metallic transducer is built therein, by a process such as sputtering. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

Heads are often designed to include a pole tip recession (PTR), which is the distance the pole-tip of a transducer is recessed from the bottom surface of the slider. The spacing between the transducer and the disc is equal to the PTR in addition to the fly height. Manufacturing variances in transducer heads, sliders, gimbals and load beam assemblies result in different fly heights and PTRs, which limits precision in spacing between a transducer and a disc.

Accordingly, some transducer heads include a deformable material that allows the transducer-disc spacing to be adjusted to account for variances in fly height and PTR in an assembled disc drive. A deformable material may be integrated within the head during manufacture by adding an additional layer on the substrate. For example, a transducer head may include a material with known thermal expansion properties and a heater that can be set to a plurality of settings. Each setting corresponds to a PTR adjustment according to the thermal expansion properties. After assembling a disc drive, as part of the manufacturing process, heater settings are incrementally increased until the transducer head contacts the media surface. At this point the PTR could be said to be a pole tip protrusion since the pole tip actually extends beyond the bottom surface of the slider. Using the known heater setting at which the transducer head contacts the media surface and known heater response function, an operational heater setting corresponding to an optimal PTR adjustment is calculated. The operational heater setting is less than the heater setting at which the media surface is contacted, such that the transducer is retracted from the media surface. During operation of the disc drive the heater operates at the calculated heater setting. In this manner, the PTR for each head is adjusted as part of the manufacturing process to increase precision in the distance between a transducer and the rotating disc medium beyond the physical capability of the utilized manufacturing processes.

SUMMARY

A device includes one or more heads including a transducer. Each head also includes a deformable material that allows a distance between the data storage medium and the transducer to be adjusted on the head according to a plurality of settings. The device calculates a response function relating the change in distance between the disc and the transducer to a setting change for each head by measuring a change in the transducer-data storage medium spacing corresponding to at least two settings. The device also performs a self-test to determine an optimal setting. The device may also repeat response function calculations and/or determination of optimal settings to ensure continued optimal performance of the disc drive. In summary, the device sets the distance between the data storage medium and the transducer on each head using a calculated response function particular to each head.

In some embodiments, the deformable material may be a material that possesses significant thermal expansion properties. Head utilizing such materials include a heater, which may simply be a resistive coil patterned adjacent to the deformable material. The settings in such a head are provided by varying voltage across the heater, which changes the temperature of the deformable material and alters the distance between the transducer and the disc.

Calculation of the response function, e.g., a heater response function, may be accomplished by measuring amplitude gain control (AGC) values for at least two settings. These AGC values are then input into a Wallace equation to directly relate spacing change to the change in heater setting according to disc rotational velocity, frequency of the data pattern and voltage of the readback signal. These techniques require the disc drive to recognize analogue voltage strength of the readback signal. This is in contrast to reading stored data from the data storage medium, which instead requires filtering analogue voltages of the readback signal to yield digital data stored on the data storage medium.

In one embodiment, a device comprises a data storage medium, a transducer for communicating with the data storage medium, a deformable material that provides a distance between the data storage medium and the transducer corresponding to one of a plurality of selectable settings, and a control module integrated with the device that determines a response function of the change in the distance between the data storage medium and the transducer relative to a change in selected settings of the plurality of selectable settings.

In another embodiment, a method comprises writing a first pattern to a first location on a data storage medium of a device, selecting a first setting from a plurality of settings that corresponds to a first distance between the data storage medium and a transducer of the device, receiving a first signal produced by the transducer as the transducer reads the first pattern at the first setting, selecting a second setting from a plurality of settings that corresponds to a second distance between the data storage medium and the transducer, receiving a second signal produced by the transducer as the transducer reads the first pattern at the second setting, and determining a first response function that relates the difference between the first distance and the second distance to the difference between the first setting and the second setting according to the first signal and the second signal.

In an embodiment, a device comprises a data storage medium, a transducer that communicates with the data storage medium, a component that adjusts a distance between the data storage medium and the transducer according to each of a plurality of selectable settings, a means for determining a response function correlating the distance to the plurality of selectable settings, and a means for determining an optimal setting among the plurality of selectable settings.

Embodiments of the invention may provide one or more of the following advantages. For example, embodiments of the invention may account for not only variances in fly heights and PTRs in an assembled disc drive, but also variances in response functions for every head. This increases the precision of the distance between a transducer and a media surface. Furthermore, embodiments of the invention may provide for a transducer-disc spacing adjustment and response function calibration of a fully operational drive, which may account for variations in response characteristics particular to each head. This provides increased precision in transducer-disc spacing, which may improve reliability and allow increased data storage density.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
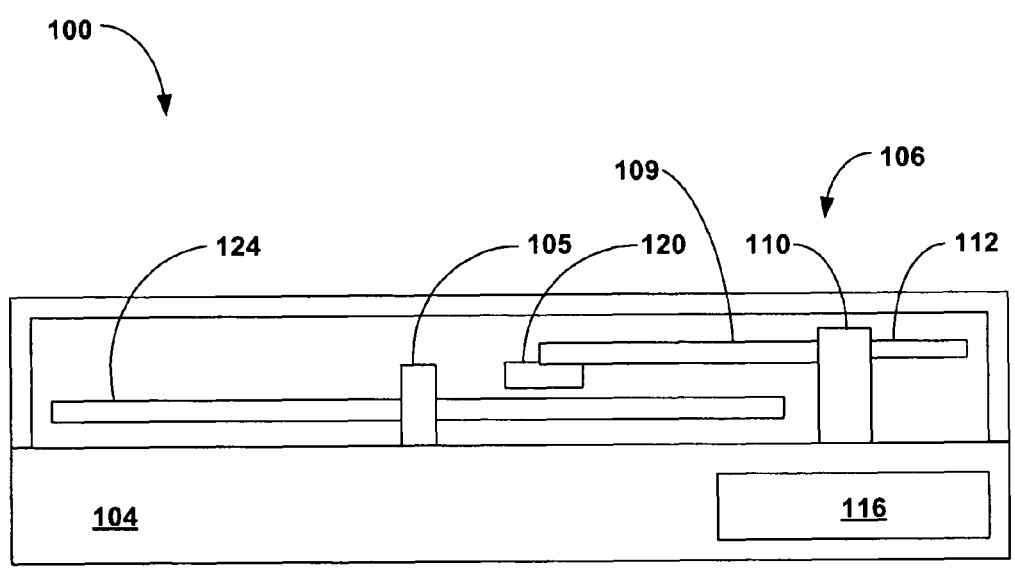
FIG. 1 is an illustration of a disc drive.

FIG. 1 is an illustration of disc drive 100 including slider 120 according to an embodiment of the invention. Disc drive 100 includes a data storage disc 124 mounted to base 104 via rotational bearing 105. For example, disc 124 may be a magnetic disc, optical disc, magneto-optic disc or other data storage disc. Disc drive 100 also includes an actuator assembly 106, which pivots about bearing shaft assembly 110. Actuator assembly 106 includes actuator arm 109 and voice coil 112, which interacts with a permanent magnet (not shown) to rotate actuator assembly 106 about bearing shaft assembly 110. Rotating actuator assembly 106 about bearing shaft assembly 114 moves slider 120 across media tracks of disc 124. Slider 120 carries one or more read/write heads, which can record and retrieve data from the recordable surface of media disc 124. During operation of disc drive 100, rotation of disc 124 generates air movement which acts to keep slider 120 supported a small distance above the surface of disc 124.

The one or more heads of slider 120 include transducers with pole tips. The one or more heads also include a deformable material that allows the distance between disc 124 and the pole tip to be set to one of a plurality of selectable settings. For example, the deformable material may be a material that possesses significant thermal expansion properties. In such embodiments, the plurality of selectable settings may be provided by varying voltage across a heater adjacent to the deformable material to change the temperature of the deformable material. Changing the temperature of the deformable material results in moving the pole tip relative to slider 120 to alter the distance between disc 124 and the pole tip.

Disc drive 100 also includes a control module 116, which is integrated within disc drive 100. Control module 116 functions to determine a response function correlating the distance between the disc and the pole tip for each of the plurality of selectable settings of the deformable material. Control module 116 also determines an optimal setting among the plurality of selectable settings according to a designed optimal distance between the disc and the pole tip.

In various embodiments, control module 116 and the functions thereof may be implemented by executing instructions within discrete hardware circuitry, firmware, software executing on a programmable processor, a computer-readable medium with one or more processors, or combinations thereof.

Disc drive 100 is shown for exemplary purposes only. For example, in other embodiments, a disc drive may include multiple discs, actuator arms and sliders. In disc with multiple sliders, each of the sliders may support heads with a deformable material that allows selecting a distance between disc 124 and a pole tip according to one of a plurality of selectable settings.

Figure 2A:
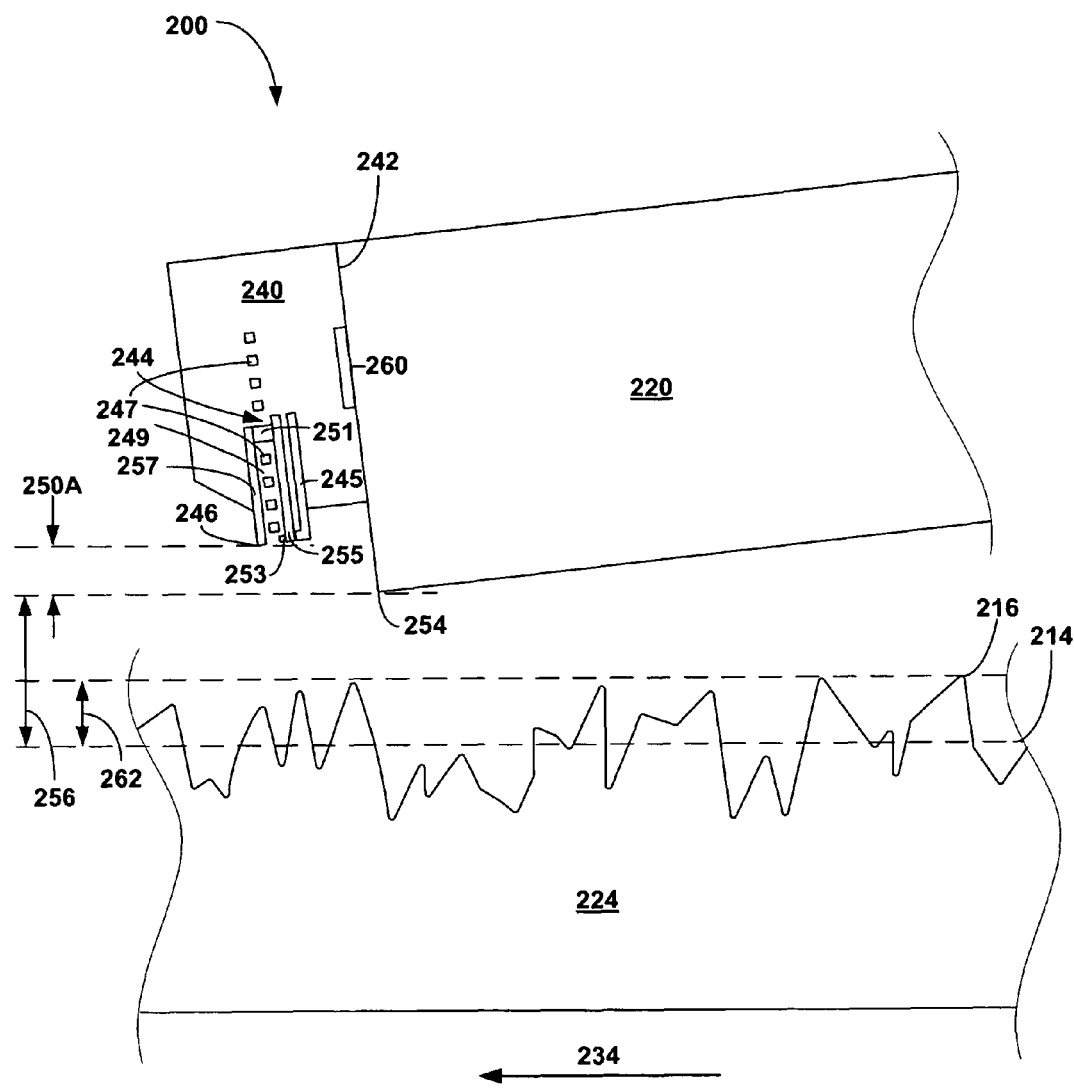
FIGS. 2A and 2B are close-up illustrations of a slider-disc interface.
Figure 2B:
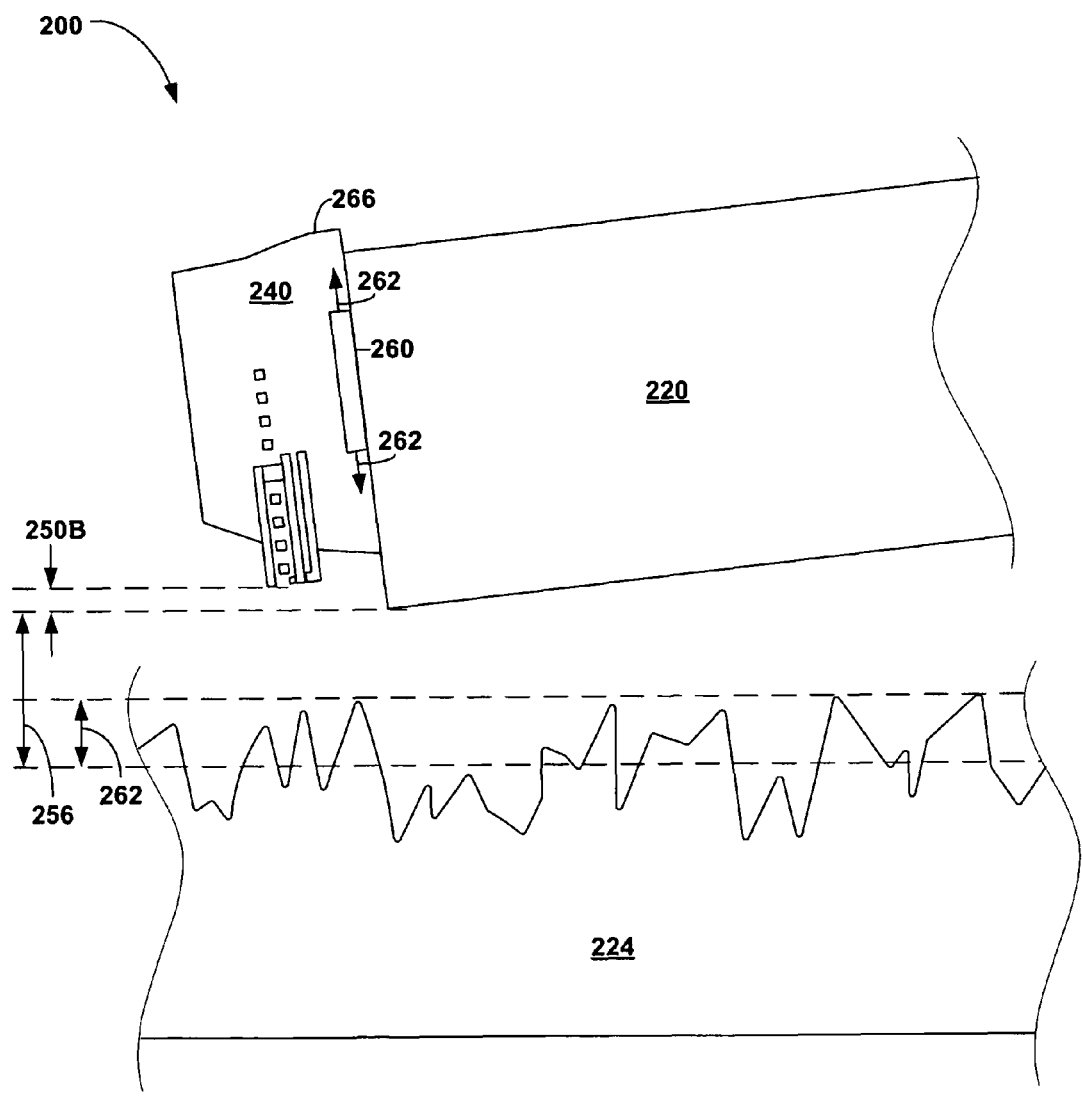

FIGS. 2A and 2B are close-up illustrations of slider 220 flying above disc 224. FIGS. 2A and 2B are structurally the same. For this reason, the design and layout of slider 220 and disc 224 are described with reference to FIG. 2A, but are the same for FIG. 2B. Disk 224 travels in direction 234 relative to slider 220 and head 240.

Disc 224 is shown with an irregular surface, which is the result of limitations in manufacturing of disc 224. Given actual scale, disc 224 would appear smoother, but the irregularities are exaggerated on disc 224 for illustrative purposes. The peak height of the irregular surface of disc 224 corresponds to line 216, while the average height of the irregular surface of disc 224 corresponds to line 214. The difference between these heights, a measure of the surface roughness of disc 224 is glide avalanche (GA) 262. The average height, line 214, is significant because it represents the reference plane to determine fly height 256 of slider 236. The peak height, line 216, is significant because it represents the minimum spacing slider 236 and transducer 246 can achieve without contracting disc 224.

Slider 220 may be composed of a wafer of an electrically-conductive, ceramic substrate material such as $Al_2O_3$, TiC, AlTiC, Si, SiC, $ZrO_2$ or other composite materials formed of combinations of these materials.

Head 240 is mounted to slider 220. Interface 242 defines the intersection of the different materials of slider 220 and head 240. Head 240 may be formed from an insulating material, such as $Al_2O_3$, AlN, $SiO_2$, $Si_3N_4$, SiC, or $SiO_{0-2}N_{0-1.5}$. Insulating material for head 240 may be selected to closely match the chemical and mechanical properties of the material used for slider 220. For example, an $Al_2O_3$ head 240 could be used in conjunction with an AlTiC slider 220.

FIG. 2A further shows transducer 244 and transducer pole tip 246. Transducer 244 with pole tip 246 is formed from electrically conductive patterns embedded within head 240. Such metals, such as NiFe, typically have large coefficients of thermal expansion. Because more than one transducer 244 may be formed within head stack 240, the insulating properties of head 240 prevent multiple transducers from shorting each other out during operation. Encapsulation of transducer 244 within head 240 can be achieved by chemical vapor deposition, a photolithographic process, or another process used in integrated circuit manufacturing.

Transducer 244 includes reader 245 and a writer. The writer includes conductive coils 247, core fill 249, back via 251, shared pole extension 253, bottom pole 255 and top pole 257. The portions of bottom pole 255 and top pole 257 which extend from head 240 are generally referred to as pole tip 246. Conductive coil 247 wraps around back via 251 such that the flow of electrical current through conductive coil 247 generates a magnetic field for a write operation.

Pole tip recessions 250A and 250B are the differences in height between the bottom surface of pole tip 246 and the bottom surface of slider 220 in FIGS. 2A and 2B respectively. As described herein, "pole tip recession 250" refers in general to the difference in height between the bottom surface of pole tip 246 and the bottom surface of slider 220, whereas pole tip recessions 250A and 250B are particular to the state of head 240 as shown in FIGS. 2A and 2B. As shown, pole tip 246 protrudes from head stack 240. However, in some instances, pole tip 246 may recede into head stack 240. The closest point 254 of slider 220 to disc 224 occurs at interface 242. The distance between point 254 and line 214 is fly height 256. As can be seen, pole tip 246 fly height is equal to pole tip recession 250A plus fly height 256. In some cases, pole tip recession 250A may have a negative value, meaning transducer 244 actually protrudes beyond the bottom surface of slider 220.

Deformable material 260 may be a film, or other form, such as a mass of bulk material in the form of a stud or another structure. In one embodiment, deformable material 260 is deposited onto slider 220 by slider manufacturing processes such as sputtering, cold pressing, and pulsed laser deposition. In the embodiment illustrated in FIGS. 2A and 2B, deformable material 260 is located at interface 42. In other embodiments, deformable material 260 may be placed elsewhere within or on head 240 or slider 220.

Deformable material 260 is capable of undergoing a semi-permanent or permanent deformation. The term "semi-permanent" includes magnetostrictive changes in structure, plastic deformations, and phase transformation induced deformations. Material 260 may be deformed by the application of an activating energy including magnetism, temperature change, pressure force and other forms of excitement. Plastic deformations refer to those in which the deformed material retains its deformed configuration even after removal of the activation or deformation energy. Phase transformation induced deformations are an example of semi-permanent deformations. Shape memory alloys (SMA) generally exhibit phase transformation induced deformations. Generally, SMAs are materials that are deformed at a low temperature and then changed back to their original undeformed condition at a higher temperature. As long as the temperature is such so that the SMA remains in one state, the form of the SMA is retained and does not change, even upon removal of the activating energy. As another example, magnetostrictive deformations can be rendered semi-permanent where the deformed configuration of the material is maintained by the placement of a permanent or semi-permanent magnet in the vicinity of the deformable material.

Elastic deformations are contrasted with semi-permanent deformations such as plastic deformations, phase transformation induced deformations and magnetostrictive deformations. With elastic deformations, the deformed material returns to its undeformed state upon removal of the activation energy. Thus, with elastic deformations, the activation energy must be continually applied to retain the material in its deformed configuration.

As shown in FIG. 2B, deformable material 260 has been deformed so as to expand and push down upon transducer 244, thereby moving the bottom surface of pole tip 246 to closer to the surface of disc 224. This displacement reduces pole tip recession 250 from pole tip recession 250A to pole tip recession 250B. GA 262 and fly height 256 remain consistent in FIGS. 2A and 2B. However, in same cases, a change in fly height 256 may require adjustment of pole tip recession 250 to ensure optimal spacing between pole tip 246 and disc 224. For example, fly height 256 may change due to a change in operating conditions of the disc drive, deterioration of slider 220 or for other reason.

While deformable material 260 is illustrated as a film which expands only in the linear direction indicated by arrows 262, other depositions of deformable material may be used, including masses of bulk material distributed in other locations within and on slider 220. Deformable material 260 is deposited in head 240 during the processing of head 240. During the manufacture of slider 220, deformable material 260 is activated, resulting in a semi-permanent change in strain. Activation may be accomplished by a magnetic field, an applied voltage, surface heating using lasers, cooling, and thermal annealing, for example, or any combination thereof, depending on the magnitude of strain change desired and the materials and design of head 240, slider 220 and deformable material. In some embodiments, the strain is semi-permanent because it may be reversed by exposing deformable material 260 to a magnetic field, voltage, or temperature different in magnitude or character than that used to activate deformable material 260.

Where deformable material 260 grows in length in both directions along arrows 262, a bump 266 may form as the growth of deformable material pushes the material of head 240 in the upward as well as the downward directions.

Disc 224, slider 220 and head 240 are components of a disc drive. As will be described in more detail with respect to FIG. 4, the disc drive calculates a response function of a spacing change to a setting change for each transducer 244 by measuring a change in the pole tip-disc spacing corresponding to at least two settings. The disc drive may calculate the response function, e.g., a heater response function, by measuring AGC values for at least two settings. These AGC values are input into a Wallace equation to directly relate spacing change to the change in setting according to disc rotational velocity, frequencies of data patterns on disc 224 and voltage of a readback signal from reader 245. These techniques require the disc drive to recognize analogue voltage strength of the readback signal from reader 245. This is in contrast to reading stored data from disc 224, which instead requires filtering analogue voltages of the readback signal to yield digital data stored on disc 224.

As will be described in more detail with respect to FIG. 3, the disc drive also performs a self-test to determine an optimal setting. To perform the self-test, the disc drive incrementally increases the settings until pole tip 246 contacts disc 224 at line 216. Using a known value for GA 262 and the calculated response function, the disc drive then determines the optimal setting, which corresponds to the desired spacing between pole tip 246 and disc 224 (line 214).

The disc drive may repeat the response function calculation and/or self-test to ensure continued optimal performance of the disc drive. This may improve precision in the spacing of transducer 244 and disc 224. For example, the response function may change over the life of a drive. As one example, the resistance of a heater used to perform spacing adjustment may change over the life of a drive. Furthermore, the fly height of a slider may also change over the life of a drive. These and other changes can be mitigated by repeating the response function calculation and/or self-test, e.g., as specified by a user and/or at regular intervals. As will be described in more detail with respect to FIG. 5, the disc drive may also determine if the disc drive is unstable, for example, if the calculated optimal setting differs from a previous calculated optimal setting by more than an acceptable level. This may allow a user to back up data stored on disc 224 before is becomes unreadable.

The design of head 240 and slider 220 as shown in FIGS. 2A and 2B is exemplary. Embodiments of the invention may be implemented with any disc drive design that provides adjustable spacing between a read and/or write transducer and a disc.

Figure 3:
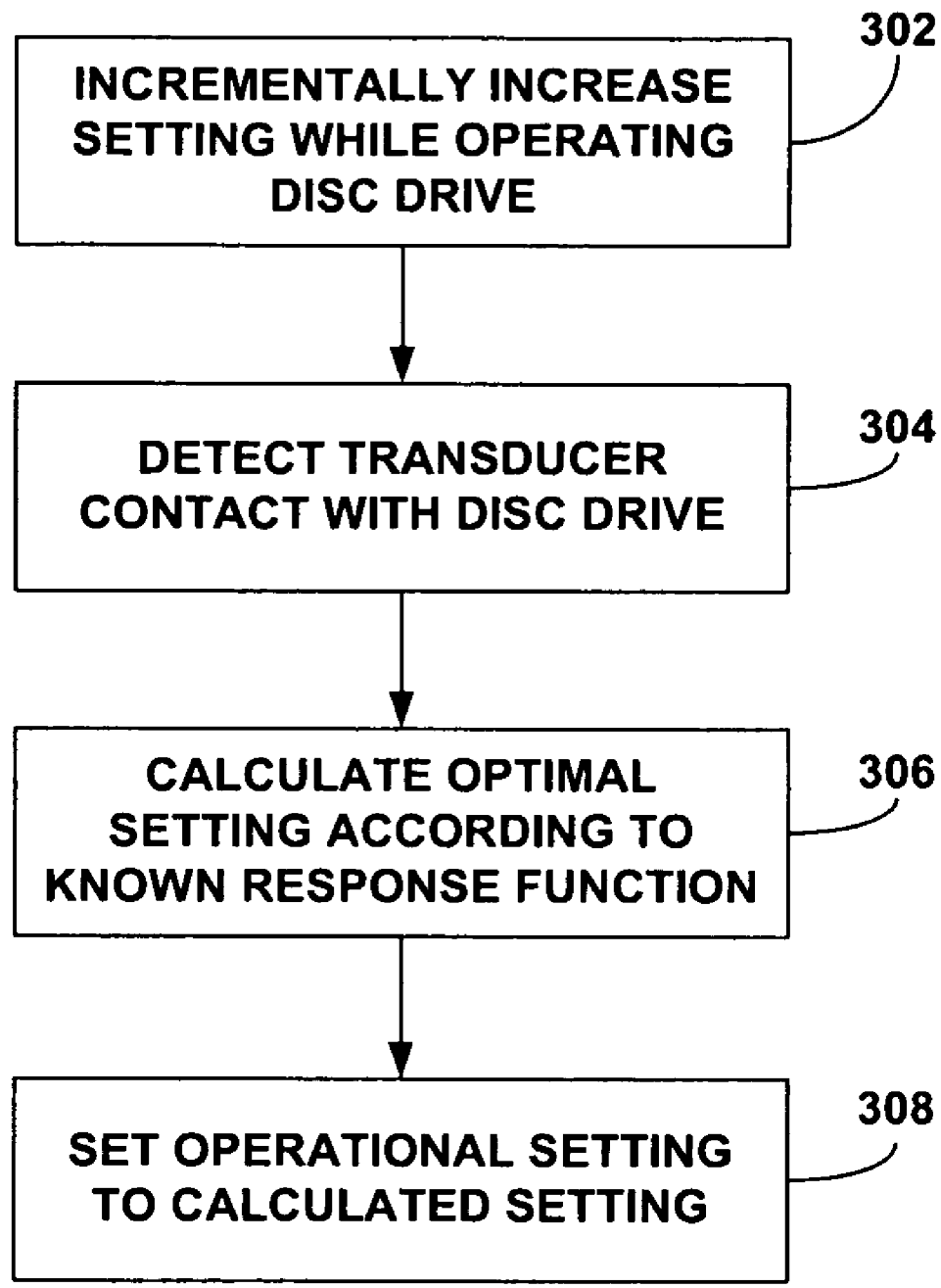
FIG. 3 is a flowchart illustrating a method of determining an optimal setting corresponding to a designed pole tip-disc spacing.

FIG. 3 is a flowchart illustrating a method of determining an optimal setting corresponding to a designed pole tip-disc spacing. The method illustrated in FIG. 3 may be implemented by a control module of a disc drive having at least one transducer with adjustable spacing between a transducer and a disc. For example, the method may be implemented by control module 116 of FIG. 1.

First, the control module incrementally reduces the spacing between the transducer and the disc by increasing the adjustment setting, for example by increasing a heater setting (302).

The control module continues to decrease the spacing between the transducer and the disc until the transducer contacts the surface of the disc (304). The control module knows when the transducer contacts the surface of the disc by using an algorithm the correlates a disturbance in a position signal of the transducer. For example, the algorithm may have been developed by correlating the disturbance in the position signal and physical wear characteristics of the transducer. Other techniques for detecting disc-transducer contact may also be used. Once the transducer contacts the disc, the control module knows that the transducer-disc spacing is equal to the GA of the disc surface. Because the GA of a manufactured disc is a known quality of the disc, the control module then know the transducer-disc spacing at that setting, e.g., at that heater setting.

In the next step, the control module calculates the optimal setting using a known response function (306). For this step, the control module refers to a defined optimal spacing and determines the distance the transducer-disc spacing must be adjusted from the GA. The control module then used this distance and the response function to determine what setting will produce the defined optimal spacing. In some instances, the response function may be non-linear. A non-liner response function may require the control module to also input the known setting that produces contact with the disc. The response function may be consistent throughout the life of the disc drive, calibrated as will be described with reference to FIG. 4 or defined by other techniques.

In the final step, the control module simply sets the operational setting, e.g., a heater setting, to be the calculated setting (308).

The method of determining an optimal setting corresponding to a designed pole tip-disc spacing may be repeated to ensure transducer-disc spacing remains consistent. For example, the method may be repeated at regular intervals, as specified by a user or a computer program, or for other reason. In disc drives with multiple transducers, the control module may repeat the method illustrated in FIG. 3 for other transducers in the disc drive.

Figure 4:
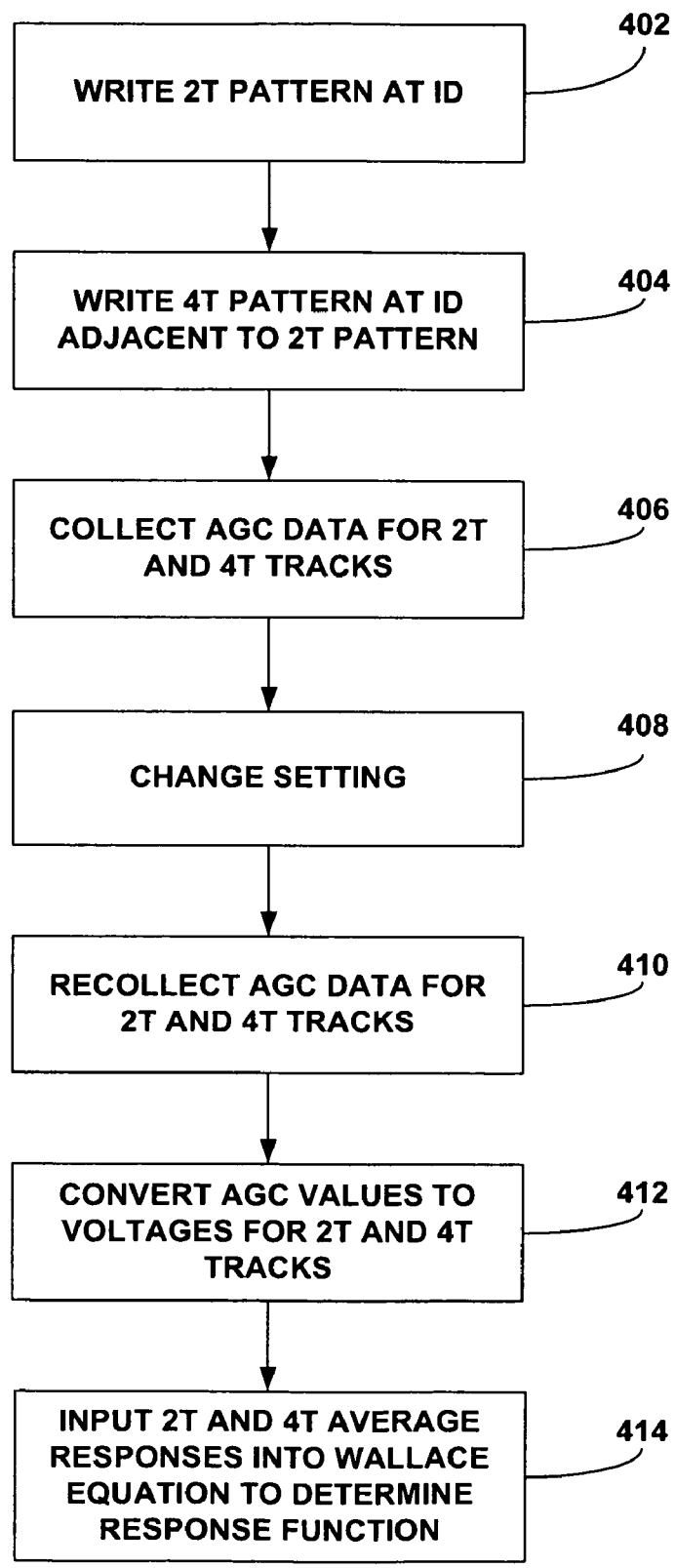
FIG. 4 is a flowchart illustrating a method of determining a response function relating a change pole tip-disc spacing to a setting change particular to a head.

FIG. 4 is a flowchart illustrating a method of determining a response function relating a change pole tip-disc spacing to a setting change particular to a head. The method illustrated in FIG. 4 may be implemented by a control module of a disc drive having at least one transducer with adjustable spacing between a transducer and a disc. For example, the method may be implemented by control module 116 of FIG. 1. Furthermore, the method illustrated in FIG. 4 may be combined with the method FIG. 3 to increase precision in transducer-disc spacing adjustment.

In step 402, the control module writes a 2T pattern on a data track at the inner diameter of a disc. A 2T pattern is the phrase "1100" repeated over and over, i.e., "110011001100110011001100 . . ." In step 404, the control module writes a 4T pattern on a data track adjacent to the 2T data track. Similar to 2T, in a 4T pattern, the phrase "11110000" is repeated. In other embodiments, as few as a single pattern on a single data track may be used, but using more data tracks and patterns increases the precision of the calculated response function. Also, multiple non-adjacent tracks may be used instead of adjacent track and other patterns and/or different combinations of patterns may be used instead of the 2T and 4T patterns.

Next, the control module collects AGC data for both the 2T and the 4T tracks at a first setting (406). In order to produce a single AGC value for each track, the control module may combine data from every sector in a track. For example, the control module may take the mean or the median AGC values of the sectors in each track.

The control module then changes the setting and recollects the AGC data for each track (410). As in step 406, in order to produce a single AGC value for each track, the control module may again combine data from every sector in a track.

In the next step, the control module converts each of the four ACG values to voltages (412). The four ACG values correspond to a value for each of the first track and the first setting, the second track and the first setting, the first track and the second setting, the second track and the second setting.

Next, the control module performs separate calculations based on the Wallace equation for each of the tracks. The Wallace equation is shown below as Equation 1.

$$V(d, \lambda) = V(0) * e^{d\left(\frac{-2\Pi}{\lambda}\right)} \quad \text{(Equation 1)}$$

In Equation 1, the known values are "V(d,λ)", which is one of the voltages produced in step 412, and "λ", which is the wavelength of the signal written to a track (in this case either the 2T or the 4T signal). There are two unknowns in Equation 1 for each track: "V(0)", which is a constant for track, and "d", which is the distance separating the pole tip of the transducer from the disc surface. Because two measurements were taken for each track (in steps 406 and 410), two Wallace equations can be combined to create a single equation relating the change in transducer-head spacing as a result of the change in the applied settings of step 408. This combined equation is shown below as Equation 2.

$$(d_2 - d_1) = \frac{Radius * RPM}{60 * Freq} * \ln\left(\frac{V_1(d_1, \lambda)}{V_2(d_2, \lambda)}\right) \quad \text{(Equation 2)}$$

In Equation 2, each of the values on the right side are known. "$V_1(d_1,\lambda)$" is the voltage corresponding to the first setting, and "$V_2(d_2,\lambda)$" is the voltage corresponding to the second setting. "Radius" represents the radius of the data track, "RPM" represents the rotational velocity of the disc, "Freq", is the frequency of the collected signal pattern, which is directly related to "$\lambda$". As compared to Equation 1, "$\lambda$" has been converted to "Freq" in Equation 2. By computing the known values on the right side of Equation 2, the control module determines a change in transducer disc spacing, "$(d_2-d_1)$". By relating this change in transducer disc spacing to the change in setting in step 408, the control module determines a response function.

A response function can be produced from the recorded AGC values of a single track, but two tracks are used in the embodiment illustrated in FIG. 4. The control module performs the calculation of Equation 2 for each of the tracks: the 2T track and the 4T track. The control module combines the response function corresponding to the 2T track and the 4T track to produce a single calculated response function (414). For example, the control module may combine calculated response functions for each track by averaging the response functions of each track. Other techniques of combining the response functions may also be used.

While only two settings, each providing at least one voltage, are required to create a response function, more settings may be used to increase the accuracy and precision of the response function. The response function can be linear, second-order, third-order or other type of function. The type of response function, e.g., the order of the response function, is related to the number of settings that should be used to produce an accurate response function in a minimal amount of time using a minimal amount of calculations. In general, determining an accurate second-order response function requires using more heater settings and calculations than with a linear response function. In the same manner, an accurate third-order response function requires using more heater settings and calculations than with a second-order response function.

In various embodiments, the control module may use a predefined order response function, a set number of heater settings, and a set number of data tracks in determining a response function. In other embodiments the control module may determine an order of the response function, the number of heater settings, the number of data tracks used and/or the number data tracks used for each setting. The control module may make a determination of accuracy of a calculated response function to determine if more measurements need to be taken or if the type of the response function should be changed, e.g., to a higher order. For example, the control module may increase the order of the response function and/or the number of measurements, settings and data tracks to obtain at least a threshold standard deviation for data used to calculate the response function relative to the response function.

The method illustrated in FIG. 4 may be repeated to ensure precise transducer-disc spacing. For example, the method may be repeated at regular intervals, as specified by a user or a computer program, or for other reason. In disc drives with multiple transducers, the control module may repeat the method illustrated in FIG. 4 for other transducers in the disc drive.

While Equation 2 is shown for exemplary purposes, equivalent equations may also be used. For example, an equivalent equation may use pattern wavelength ("$\lambda$" in Equation 1) rather than signal frequency. Other examples of equivalent equations include those which reposition the variables of Equation 2.

Figure 5:
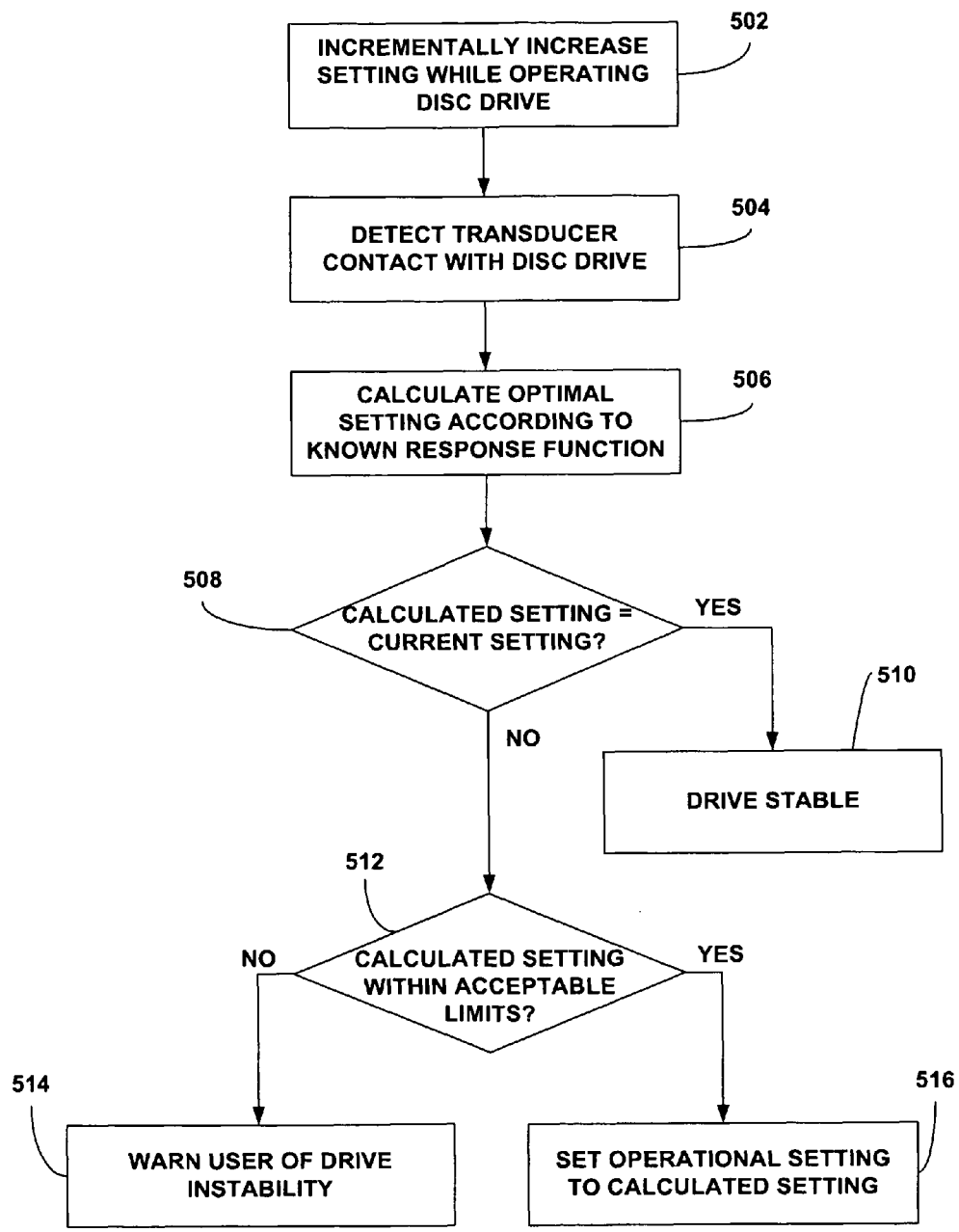
FIG. 5 is a flow chart illustrating a method of determining drive instability using previously described techniques.

FIG. 5 is a flow chart illustrating a method of determining drive instability using previously described techniques. Steps 502, 504, 506 and 516 are similar to the method shown in FIG. 3, but the method illustrated in FIG. 5 includes additional steps to determine if a drive is unstable. The method illustrated in FIG. 5 may be implemented by a control module of a disc drive having at least one transducer with adjustable spacing between a transducer and a disc. For example, the method may be implemented by control module 116 of FIG. 1.

First, the control module incrementally reduces the spacing between the transducer and the disc by increasing the adjustment setting, for example by increasing a heater setting (502).

The control module continues to decrease the spacing between the transducer and the disc until the transducer contacts the surface of the disc (504). Once the transducer contacts the disc, the control module knows that the transducer-disc spacing is equal to the GA of the disc surface. Because the GA of a manufactured disc is a known quality of the disc, the control module then know the transducer-disc spacing at that setting, e.g., at that heater setting.

In the next step, the control module calculates the optimal setting using a known response function (506). For this step, the control module refers to a defined optimal spacing and determines the distance the transducer-disc spacing must be adjusted from the GA. The control module then used this distance and the response function to determine what setting will produce the defined optimal spacing. In some instances, the response function may be non-linear. A non-liner response function may require the control module to also input the known setting that produces contact with the disc. The response function may be consistent throughout the life of the disc drive, calibrated as will be described with reference to FIG. 4 or defined by other techniques.

Then the control module compares the calculated optimal setting to the current setting for operation of the disc drive (508). The current setting may be a setting previously determined by the control module using the methods of FIG. 3 or FIG. 5. In other cases the current setting may be defined as an average setting for a control group disc drives manufactured with the same design. If the calculated optimal setting is the current setting, the control module continues to use the current setting and the disc drive is stable (510).

If the calculated optimal setting is different than the current setting, the control module determines if the calculated setting is within acceptable limits (512). In various embodiments, acceptable limits may be defined in a variety of manners. For example, an acceptable limit may constitute an allowed range relative to the current setting. In another embodiment, acceptable limits may be a constant range used throughout the drive. In another embodiment, acceptable limits may simply be the maximum capability of the head to adjust transducer-disc spacing.

If the calculated optimal setting is within acceptable limits, the control module sets the operational setting, e.g., a heater setting, to be the calculated setting (516). If the calculated optimal setting is outside acceptable limits, the control module may warn a user that the drive in unstable (514). This allows the user to back-up data stored on the drive before it becomes unusable. In disc drives with multiple transducers, the control module may determine that only the transducer-disc interface of the currently tested transducer is unstable. In such embodiments, the control module may, for example, inform a user of the instability and/or automatically move data stored on that portion of the drive to stable portions of the drive. In this manner, various embodiments of the invention provide increased reliability and notice to a user of impending data loss at a time when the data is still accessible.

The method illustrated in FIG. 5 may be repeated to ensure transducer-disc spacing remains consistent. For example, the method may be repeated at regular intervals, as specified by a user or a computer program, or for other reason. In disc drives with multiple transducers, the control module may repeat the method illustrated in FIG. 5 for other transducers in the disc drive.

Various embodiments of the invention have been described. However, various modifications can be made to the described embodiments within the spirit of the invention. For example, embodiments of the invention may include writing different patterns (e.g., 2T and 4T) to different sectors within the same track rather than to sectors of adjacent tracks. Furthermore, the invention may be implemented using a data storage media other than a data storage disc, e.g., a data storage tape may be used.

These and other embodiments are within the scope of the following claims.

The invention claimed is:

1. A device comprising:
   a data storage medium;
   a transducer for communicating with the data storage medium;
   a deformable material that provides a distance between the data storage medium and the transducer corresponding to one of a plurality of selectable settings that control an activating energy that deforms the deformable material; and
   a control module integrated with the device that determines a response function of a change in the distance between the data storage medium and the transducer relative to a change in selected settings of the plurality of selectable settings.

2. The device of claim 1, wherein determining the response function includes writing a first pattern to a first location of the data storage medium and writing a second pattern to a second location of the data storage medium wherein the second location is adjacent to the first location.

3. The device of claim 2, wherein the first location is a first track and the second location is a second track.

4. The device of claim 2, wherein the first location on a first track and the second location is also on the first track.

5. The device of claim 2, wherein the first pattern is a 2T pattern and the second pattern is a 4T pattern.

6. The device of claim 2, wherein the data storage medium is a disc and the first and second locations are near an inner diameter of the disc.

7. The device of claim 6, wherein determining the response function further includes writing the first pattern to a third location and writing the second pattern to a fourth location, wherein the third location is adjacent to the fourth location and the third and fourth locations are near an outer diameter of the disc.

8. The device of claim 1, wherein the data storage medium is a disc and determining the response function includes:
   measuring a first amplitude gain control (AGC) value at a first location using a first setting of the plurality of settings;
   measuring a second AGC value at the first location using a second setting of the plurality of settings; and
   calculating a change in spacing of the transducer and the data storage medium according to the first AGC value, the second AGC value, a rotational velocity of the disc, and a frequency of a data pattern written to the first location.

9. The device of claim 1, wherein the control module uses the response function to calculate an optimal setting, wherein the optimal setting is one of the plurality of selectable settings.

10. The device of claim 9, wherein calculating an optimal setting includes:
    incrementally increasing an operational setting selected from the plurality of settings to move the transducer closer to a surface of the data storage medium with each increment;
    detecting when the transducer contacts the surface of the data storage medium;
    recording a contact setting of the plurality of settings that corresponds to the detection of the transducer-data storage medium surface contact; and
    determining the optimal setting from the contact setting and a desired transducer-data storage medium spacing using the response function.

11. The device of claim 10,
    wherein the control module compares the optimal setting to a current setting to determine if the optimal setting is within predefined acceptable limits,
    wherein the current setting is one of the plurality of settings,
    wherein if the optimal setting is within predefined acceptable limits, the control module selects the optimal setting for future operation of the device, and
    wherein if the optimal setting is not within predefined acceptable limits, the control module indicates the device is unstable.

12. The device of claim 9, wherein the optimal setting corresponds to a predetermined optimal distance between the data storage medium and the transducer.

13. A method comprising:
    writing a first pattern to a first location on a data, storage medium of a device;
    selecting a first setting from a plurality of settings that corresponds to a first distance between the data storage medium and a transducer of the device;
    receiving a first signal produced by the transducer as the transducer reads the first pattern at the first setting;
    selecting a second setting from a plurality of settings that corresponds to a second distance between the data storage medium and the transducer;
    receiving a second signal produced by the transducer as the transducer reads the first pattern at the second setting; and
    determining a first response function that relates the difference between the first distance and the second distance to the difference between the first setting and the second setting according to the first signal and the second signal.

14. The method of claim 13, further comprising:
    writing a second pattern to a second location on the data storage medium;
    receiving a third signal produced by the transducer as the transducer reads the second pattern at the first setting;
    receiving a fourth signal produced by the transducer as the transducer reads the second pattern at the second setting;
    determining a second response function that relates the difference between the first distance and the second distance to the difference between the first setting and the second setting according to the third signal and the fourth signal; and
    combining the first response function with the second response function to produce a calculated response function.

15. The method of claim 14, wherein the data storage medium is a disc and the first and second locations are near an inner diameter of the disc.

16. The method of claim 15, further comprising:
writing the first pattern to a third location; and
writing the second pattern to a fourth location, wherein the third location is adjacent to the fourth location and the third and fourth locations are near an outer diameter of the disc.

17. The method of claim 13, wherein the first signal corresponds to a first AGC value and the second signal corresponds to a second AGC value.

18. The method of claim 13, wherein the first signal corresponds to a first set of AGC values and the second signal corresponds to a second set of AGC values, wherein each AGC value in the first set of AGC values corresponds to a different sector within the first location and each AGC value in the second set of AGC values corresponds to a different sector within the second location.

19. The method of claim 13, wherein the first response function is a second order function.

20. A device comprising:
a data storage medium;
a transducer that communicates with the data storage medium;
a component that adjusts a distance between the data storage medium and the transducer according to each of a plurality of selectable settings;
a means for determining a response function correlating the distance to the plurality of selectable settings; and
a means for determining an optimal setting among the plurality of selectable settings.

* * * * *